United States Patent [19]
Ottesen et al.

[11] Patent Number: 5,367,409
[45] Date of Patent: Nov. 22, 1994

[54] EVEN HARMONIC DISTORTION COMPENSATION FOR DIGITAL DATA DETECTION

[75] Inventors: Hal H. Ottesen; Gordon J. Smith, both of Rochester, Minn.

[73] Assignee: International Business Machines Corporation, Armonk, N.Y.

[21] Appl. No.: 54,719

[22] Filed: Apr. 29, 1993

[51] Int. Cl.$^5$ .............................. G11B 5/00; G11B 5/09
[52] U.S. Cl. ........................................ 360/32; 360/46
[58] Field of Search .................... 360/32, 46, 65, 113; 369/60; 364/724.08, 768

[56] References Cited

U.S. PATENT DOCUMENTS

| | | | |
|---|---|---|---|
| 3,723,911 | 3/1973 | Forney, Jr. | 333/18 |
| 3,824,504 | 7/1974 | Parris | 333/73 |
| 4,027,239 | 5/1977 | Kerns | 324/118 |
| 4,343,026 | 8/1982 | Griffith et al. | 360/113 |
| 4,644,566 | 2/1987 | Vercellotti et al. | 375/94 |
| 4,809,336 | 2/1989 | Pritchard | 330/202 |
| 4,872,184 | 10/1989 | Yamaguchi et al. | 375/14 |
| 4,974,199 | 11/1990 | Verbanets, Jr. et al. | 364/900 |
| 5,063,453 | 11/1991 | Yoshimura et al. | 360/32 |
| 5,220,466 | 6/1993 | Coker et al. | 360/46 |
| 5,255,132 | 10/1993 | Galbraith et al. | 360/32 X |
| 5,301,080 | 4/1994 | Ottesen et al. | 360/66 |

OTHER PUBLICATIONS

Conference Paper, "Harmmonic filter design using actual recorded data" Makram et al., Apr. 1992.

IEEE Transactions on Magnetics "A note on the Harmonic Distortion in AC-Bias Recording", Muhammad Taher Abuelma Atti, Nov. 1988.

IEEE Transactions on Magnetics "Theoretical Study of the Overwrite Spectra due to Hard Transition Effects", Tang et al. Jan. 1989.

*Primary Examiner*—Donald Hajec
*Assistant Examiner*—Le Thien Minh
*Attorney, Agent, or Firm*—Joan Pennington; Richard E. Billion; Pryor A. Garnett

[57] ABSTRACT

Apparatus and method of even harmonic distortion compensation are provided for digital data detection in a disk file. The disk file includes a magneto-resistive (MR) head or other magnetic transducer head and an analog-to-digital converter (ADC) for providing a sampled readback signal. An even harmonic filter is coupled to the ADC for providing a filtered readback signal having only even harmonic components. An adder subtracts the filtered readback signal from the sampled readback signal for providing a compensated output signal. The compensated output signal is applied to a digital channel of the disk file.

8 Claims, 4 Drawing Sheets

EVEN HARMONIC DISTORTION COMPENSATION FOR DIGITAL DATA DETECTION

BACKGROUND OF THE INVENTION

1. Field of the Invention

The invention relates generally to digital signal processing, and more particularly to a method and apparatus for even harmonic distortion compensation for digital data detection in a direct access storage device (DASD).

2. Description of the Prior Art

Computers often include auxiliary memory storage units having media on which data can be written and from which data can be read for later use. Disk drive units incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. A slider supports one or more magnetic heads. The slider is lightly biased to cause the heads to move toward the recording surface when the disk is stationary; but as the disk is brought up to operating speed, an air bearing is generated which moves each slider and hence the heads away from the recording surface toward a preselected flying height. Achievement of a higher data density on magnetic disks has imposed increasingly narrow transducing gaps.

A magneto-resistive (MR) transducing head exhibits a change in resistance when in the presence of a changing magnetic field. This resistance change is transformed into a voltage signal by passing a constant current through the MR element. The value of DC voltage, for a given head, is the product of the constant bias current and the total resistance between the head lead terminals. The temperature coefficient of resistivity of the MR material is 0.02%/°C.

Even harmonic distortion in the readback signal for recording heads, particularly heads having magneto-resistive readback elements, causes excessive data error rates if not compensated. A thermal asperity (TA), for example, is a physical defect on a magnetic disk surface that when struck by the magneto-resistive (MR) element on a recording head causes a thermal response. For example, thermal asperities can locally increase the strip temperature by more than 100° C. Many of the TA's are associated with build contamination, and the TA's can grow over time. For example, it has been shown that a small disk surface defect can act as a nucleation site where debris can accumulate over time. This becomes a grown defect and eventually a TA. If not compensated for properly, it will cause customer hard data errors. The readback signal during the TA event shows large even harmonic components associated with the signal baseline shift. As heads fly lower approaching contact recording, TA's will be increasing in frequency and possibly severity. Other head non-linearities that produce baseline shift or signal asymmetry also produce even harmonic distortions that must be compensated to prevent errors which can affect file performance and cause hard data errors. When contact recording is used, MR TA events may be numerous; and the correction techniques applied will be crucial to customer acceptance.

Disadvantages of the known analog arrangements for minimizing the effect of thermal asperities on the read data include the hardware required and the corresponding electronics cost and the required error burst length for a given thermal transient amplitude. Higher data rates will require ever decreasing reaction times necessary for thermal asperity compensation. Known analog techniques will be too slow.

SUMMARY OF THE INVENTION

A principal object of the present invention is to provide an improved method and apparatus for even harmonic distortion compensation for digital data detection in a disk drive data storage system. Other objects are to provide such improved even harmonic distortion compensation method substantially without negative effects, and that overcome many of the disadvantages of prior art arrangements.

In brief, the objects and advantages of the present invention are achieved by a method and apparatus for even harmonic distortion compensation for digital data detection in a disk file. The disk file includes an analog-to-digital converter (ADC) for providing a sampled readback signal. An even harmonic filter is coupled to the ADC for providing a filtered readback signal having only even harmonic components. An adder subtracts the filtered readback signal from the sampled readback signal for providing a compensated output signal consisting of only odd harmonics. The compensated output signal is applied to a digital channel of the disk file.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE PREFERRED EMBODIMENT

Figure 1:
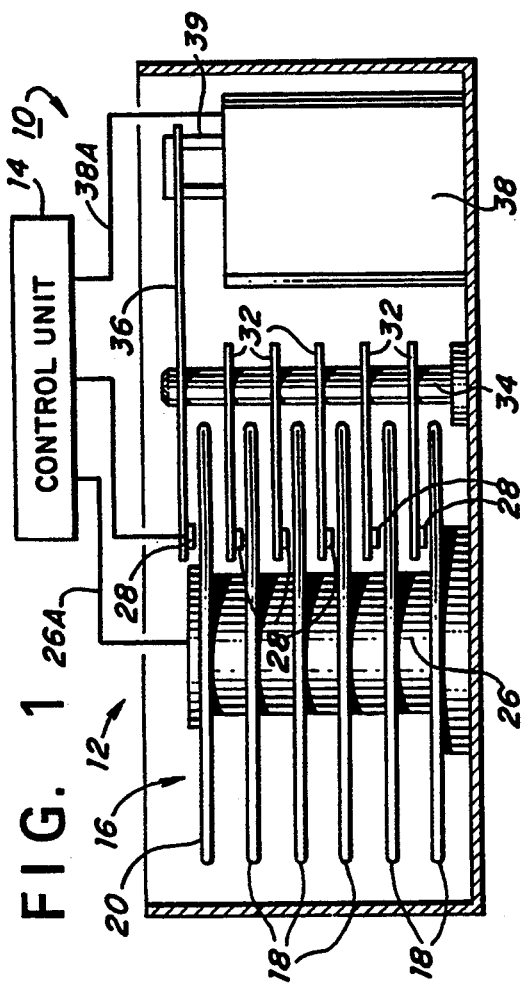
FIG. 1 is a schematic and block diagram of a data storage disk file embodying the present invention.

In FIG. 1 there is shown a partly schematic block diagram of parts of a data storage disk file 10 including a data storage medium generally designated as 12 and an interface control unit generally designated as 14. In the preferred embodiment of this invention, the data storage medium 12 is embodied in a rigid magnetic disk drive unit 12, although other mechanically moving memory configurations may be used. Unit 12 is illustrated in simplified form sufficient for an understanding of the present invention because the utility of the present invention is not limited to the details of a particular drive unit construction.

Figure 2:
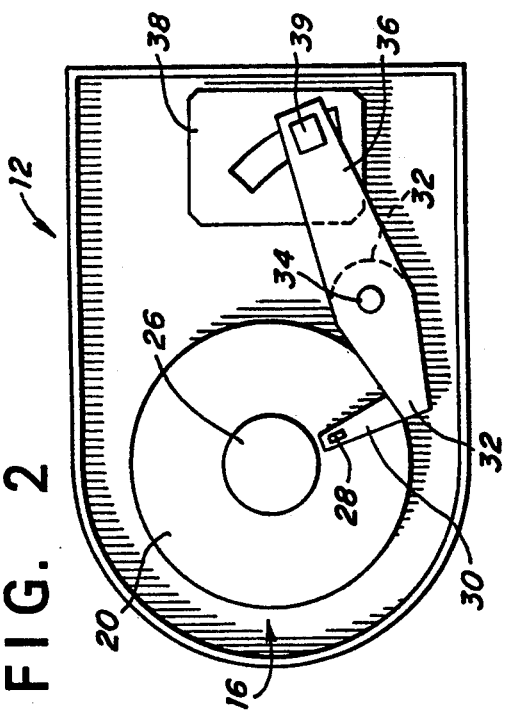
FIG. 2 is a diagram showing the accessing mechanism for a single disk surface of the apparatus of FIG. 1.

Referring now to FIGS. 1 and 2 of the drawings, disk drive unit 12 includes a stack 16 of disks 18 having at least one magnetic surface 20. The disks 18 are mounted in parallel for simultaneous rotation on and by an integrated spindle and motor assembly 26. Data information on each disk 18 are read and/or written to by a corresponding transducer head 28 movable across the disk surface 20.

Transducer heads 28 are mounted on flexure springs 30 carried by arms 32 ganged together for simultaneous pivotal movement about a support spindle 34. One of the arms 32 includes an extension 36 driven in a pivotal motion by a head drive motor 38. Although several drive arrangements are commonly used, the motor 38 can include a voice coil motor 40 cooperating with a magnet and core assembly (not seen) operatively controlled for moving the transducer heads 28 in synchronism in a radial direction in order to position the heads in registration with data cylinders to be followed. The VCM is movable within a fixed magnetic field, and the direction and velocity of the coil movement is controlled by the current supplied. The various components of the disk file 10 are controlled in operation by signals generated by control unit 14 such as motor control signals on line 26A and position control signals on line 38A.

Figure 3:
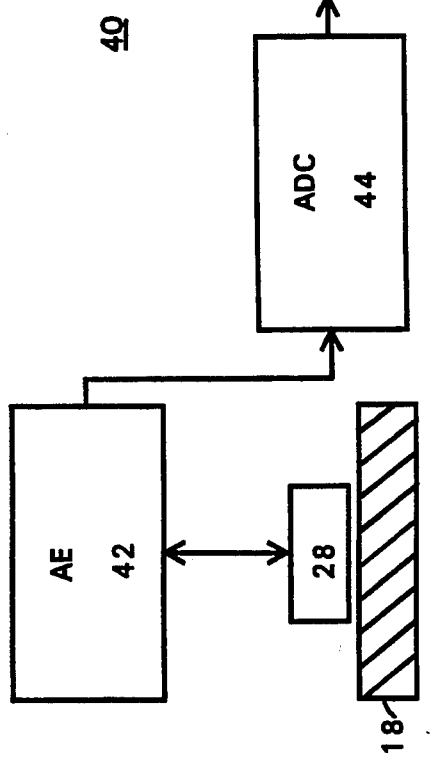
FIG. 3 is a diagram illustrating apparatus for carrying out an even harmonic distortion compensation method according to the present invention in the data storage disk file of FIG. 1.

Referring to FIG. 3, there is shown apparatus generally designated 40 for carrying out even harmonic distortion compensation according to methods of the present invention. An analog read signal is obtained by head 28 from disk 18. The readback signal obtained from the head 28 is applied to an arm electronics (AE) block 42 and amplified. The amplified read signal is sampled at an analog-to-digital converter (ADC) 44 to provide a digital sequence to an even harmonic distortion compensation block 46. Once corrected, the compensated readback signal is passed on to a recording channel 48 available in the disk file 10. The even harmonic distortion compensation block 46 of the invention acts as a preprocessor for any digital recording channel 48. Recording channel 48 can be partial-response maximum-likelihood (PRML), partial-response digital-filter (PRDF) or other digital recording channel. Even harmonic distortion compensation block 46 eliminates even harmonic distortion associated with thermal asperities, baseline shift, etc. that otherwise can affect file performance and cause hard data errors. The detection of even harmonic components in a readback signal relies on the measurement of even harmonics using digital techniques.

Figure 4:
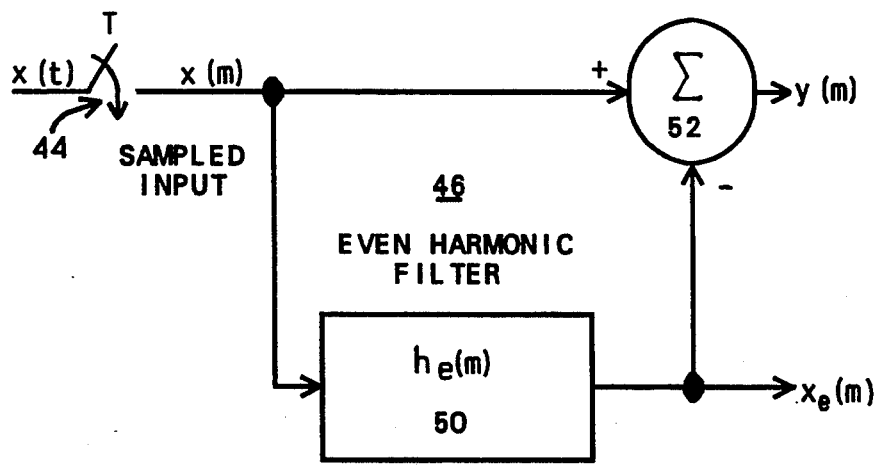
FIG. 4 is a block diagram illustrating an even harmonic distortion compensation block of FIG. 3.

FIG. 4 illustrates the even harmonic compensation block 46 used for digital filtering the readback sequence in a file in order to detect characteristic TA signatures based on the even harmonic amplitudes and to correct the readback signal for even harmonic distortion. The time constant for compensating the waveform for TA's is very short because the even harmonic content can be determined within one dibit time. This is considerably faster and more accurate than known analog methods. Even harmonic compensation block 46 includes an all even harmonic digital filter 50 and an adder or summer 52.

Figure 5:
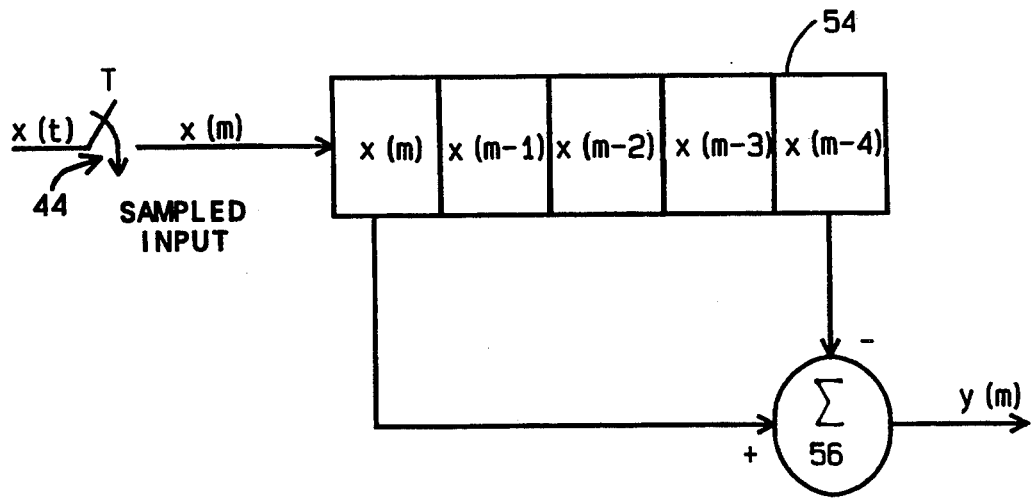
FIG. 5 is a diagram illustrating a preferred even harmonic distortion compensation circuitry of FIG. 3.

Referring now to FIGS. 4 and 5, the continuous readback signal x(t) from MR-head 28 on magnetic disk 18 is sampled at regular intervals T. The samples are converted from analog-to-digital to give the sampled input x(m), where m is the integer sampling index. The sampled signal x(m) is then passed through the all even harmonic digital filter 50 providing an output $x_e(m)$, The filtered output signal $x_e(m)$ of filter 50 only contains even harmonic components, i.e., zeroth or DC, second, fourth, sixth harmonic. $x_e(m)$ is then subtracted from original sampled signal x(m) in a summer 52 providing an output y(m). The output y(m) is free from even harmonics. y(m) will have only odd harmonics, which are required to restore the TA contaminated signal.

Assuming eight samples per cycle of the all ones frequency correspond to highest frequency content of the readback signal, the implementation for even harmonic compensation block 46 is as follows:

First the impulse response for the even harmonic filter (EHF) 50 is:

$h_e(m) = \frac{1}{2}\delta(m) + \frac{1}{2}\delta(m-4)$

The output $x_e(m)$ of EHF 50 becomes:

$x_e(m) = \frac{1}{2}x(m) + \frac{1}{2}x(m-4)$

The output y(m) is free from even harmonic distortion and can be represented as follows:

$y(m) = \frac{1}{2}x(m) - \frac{1}{2}x(m-4)$

Or, y(m) can be expressed as follows:

$y(m) = \frac{1}{2}[x(m) - x(m-4)]$

The gain "$\frac{1}{2}$" is irrelevant to the filter action and serves only as a scale factor, thus:

$y(m) = x(m) - x(m-4)$

The preferred implementation of block 46 is illustrated in FIG. 5, requiring the least amount of circuitry and is operationally very fast, i.e., having a high bandwidth. The filter requires only a five-stage shift register 54 and one subtraction provided by a summer 56. The digital filter 50 will automatically operate at the appropriate speed.

Figure 6:
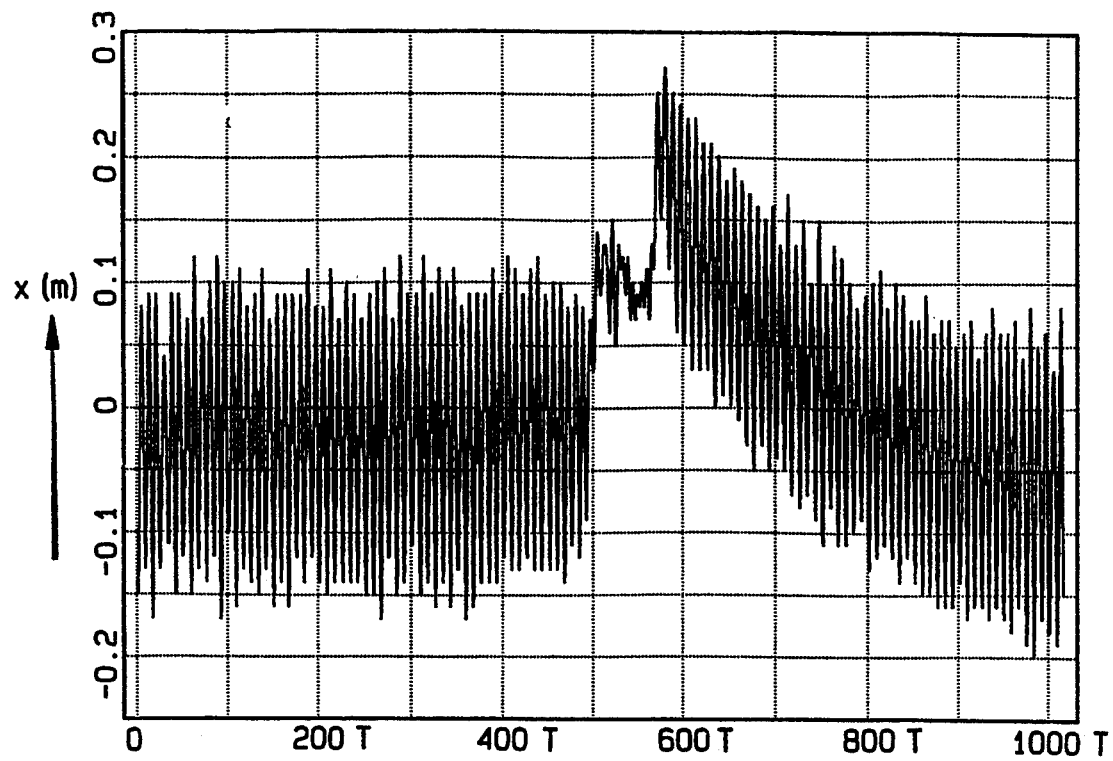
FIG. 6 is a graph to illustrate the effect of a thermal asperity in a readback signal from a magneto-resistive transducing head.
Figure 7:
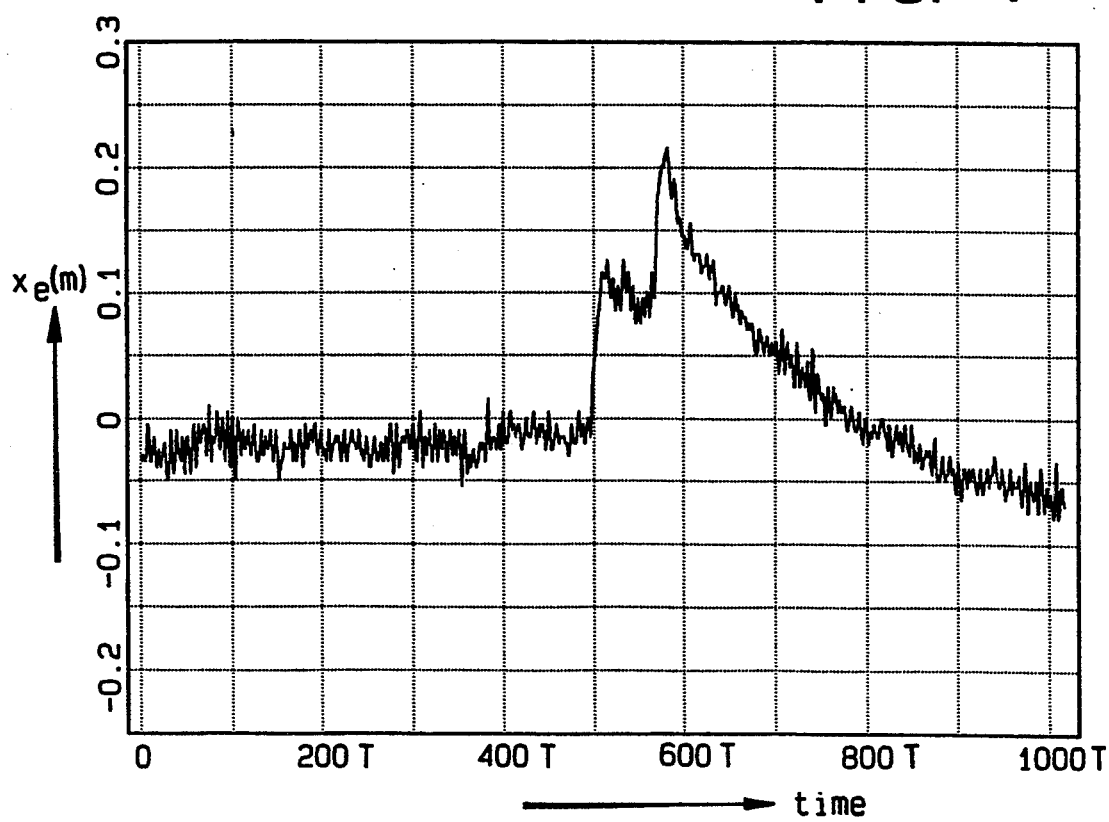
FIG. 7 is a graph to illustrate the even harmonic content for the sequence illustrated in FIG. 6.
Figure 8:
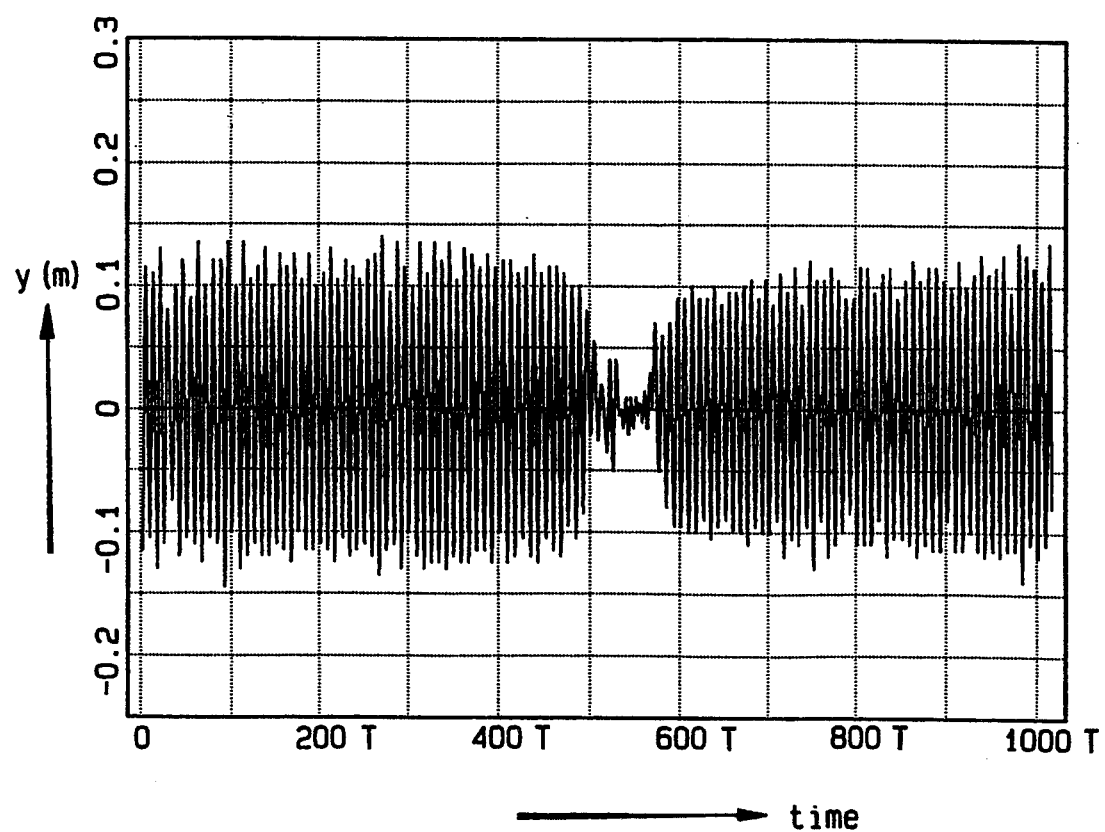
FIG. 8 is a graph to illustrate a corrected sequence of FIG. 6 with only odd harmonics present in accordance with the present invention.

Referring also to FIGS. 6, 7 and 8, when a TA occurs, for example, the readback signal from an MR head shows a baseline shift. Expected readback sample values x(m) are shown relative to the vertical axis between ±0.25 and sampling index values of sampling period T are shown relative to the horizontal axis. As shown in FIG. 6, a thermal asperity begins at 510 T and returns to the expected value range at about 800 T. FIG. 6 shows the TA response characterized by a fast rise and slow decay time of the signal baseline. In FIG. 7, the summed even harmonic content $x_e(m)$ of the sequence of FIG. 6 is displayed. Comparing FIGS. 6 and 7 shows that baseline shift is associated with even harmonic changes. Compensation for even harmonics to avoid data errors is provided by subtracting the summed even harmonics from the readback signal. The result of the subtraction is the reconstructed readback signal y(m) shown in FIG. 8. Note that the baseline shift is absent in FIG. 8 with only a period of missing bits remaining or the gap at the center of the TA sequence which may be caused by a void in the magnetic material associated with the defect. With the baseline shift associated with the TA removed, the resulting corrected signal can be processed by the channel without error.

What is claimed and desired to be secured by Letters Patent of the United States is:

Claims:

1. A method of even harmonic distortion compensation for digital data detection in a disk file having at least one disk surface mounted for rotation and a corresponding transducer head movable across the disk surface for reading and writing data information to said disk surface and including an analog-to-digital converter (ADC) coupled to the transducer head for providing a sampled readback signal, said method comprising the steps of:
   applying the sampled readback signal to an even harmonic filter for providing a filtered readback signal having only even harmonic components;
   subtracting said filtered readback signal from said sampled readback signal for providing a compensated output signal; and
   applying said compensated output signal to a digital channel of the disk file, whereby even harmonic distortion associated with thermal asperities and baseline shift from other transducer head non-linearities are compensated to prevent data errors.

2. A method as recited in claim 1 wherein the steps of applying the sampled readback signal to an even harmonic filter and subtracting said filtered readback signal from said sampled readback signal include the steps of:
   applying the sampled readback signal to a five-stage shift register; and
   subtracting x(m-4) fifth-stage output from the sampled readback signal x(m) in the first-stage output.

3. A method as recited in claim 2 wherein the step of subtracting the x(m-4) fifth-stage output from the first-stage output x(m) includes the step of:
   providing a delay equal to x(m) through x(m-4) samples.

4. A method as recited in claim 1 further includes the steps of providing a magneto-resistive transducing head coupled to said ADC in said disk drive.

5. Apparatus for even harmonic distortion compensation for digital data detection in a disk file having at least one disk surface mounted for rotation and a corresponding transducer head mounted for movement across the disk surface for reading and writing data information to said disk surface comprising:

an analog-to-digital converter (ADC) coupled to said transducer head for providing a sampled readback signal;
   an even harmonic filter coupled to said ADC for providing a filtered readback signal having only even harmonic components; and
   adder means for subtracting said filtered readback signal from said sampled readback signal for providing a compensated output signal, said compensated output signal being applied to a digital channel of the disk file, whereby even harmonic distortion associated with thermal asperities and baseline shift from other transducer head non-linearities are compensated to prevent data errors.

6. Apparatus as recited in claim 5 wherein said even harmonic filter includes a five-stage shift register including the current sample and four previous samples.

7. Apparatus as recited in claim 4 wherein said transducer head is a magneto-resistive transducer head coupled to said ADC.

8. A direct access storage device of the type including a digital data channel comprising:
   a housing;
   at least one disk mounted in said housing for rotation about an axis and having at least one disk surface for storing data;
   transducer means mounted for movement across said disk surface for reading and writing data to said disk surface;
   an analog-to-digital converter (ADC) coupled to said transducer means for converting an analog input signal to digital sample values;
   an even harmonic filter coupled to said ADC for providing a filtered readback signal having only even harmonic components; and
   adder means for subtracting said filtered readback signal from said sampled readback signal for providing a compensated output signal, said compensated output signal being applied to a digital channel of the direct access storage device wherein said compensated output signal prevents data errors associated with thermal asperities and baseline shift from other transducer head non-linearities.

* * * * *